United States Patent Office 3,417,346
Patented Dec. 17, 1968

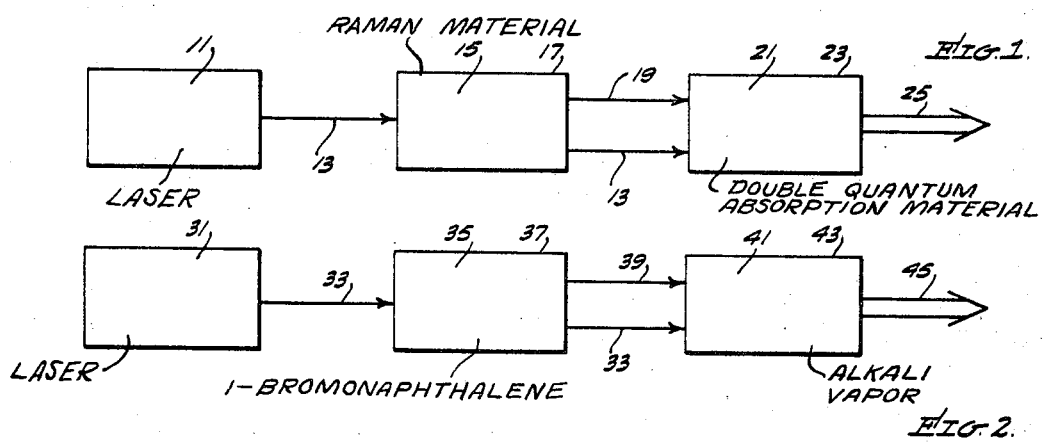
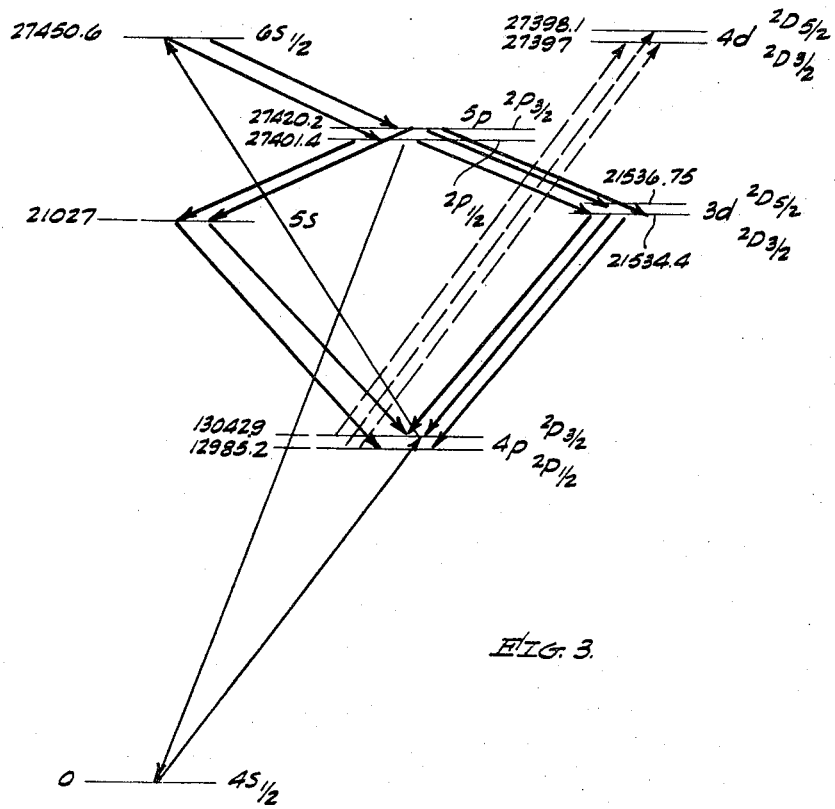

3,417,346
LASER UTILIZING A RAMAN ACTIVE MATERIAL
FOR DOUBLE QUANTUM ABSORPTION
Shaul Yatsiv, Santa Monica, Calif., assignor to Hughes Aircraft Company, Culver City, Calif., a corporation of Delaware
Filed Aug. 13, 1965, Ser. No. 479,394
9 Claims. (Cl. 331—94.5)

This invention relates to a laser and more particularly to a laser that is pumped by double-quantum absorption of two stimulated radiations.

Even before the first successful operation of a stimulated light amplifier by T. H. Maiman as reported in an article entitled "Stimulated Optical Radiations in Ruby," Nature, 187, p. 493 (1960), there had been considerable speculation concerning the creation of a state of negative absorption in gases to produce light amplification by stimulated emission of radiation (laser). As is well known, negative absorption, or amplification, is a nonequilibrium condition characterized by the existence of a pair of energy levels of which the higher is more densely populated than the lower.

Absorption transitions from a lower level to a higher level may occur in either what is known as a single-quantum transition or a double or multiple-quantum transition.

Double-quantum transitions were first discussed by M. Goeppert-Mayer in Naturwissenschaften, vol. 17, p. 932, in 1929, and were first observed in the laboratory in the microwave region by V. W. Hughes and L. Grabner as described in Physical Review, vol. 79, p. 314, 826, in 1950. The theory of these multiple-quantum transitions occurring under the influence of highly coherent applied fields has been discussed in the experimental paper by Hughes and Grabner cited above, and in a paper by P. Kusch in Physical Review, vol. 93, p. 1022, in 1954. Further description of this system in detail was published by H. Salwen in Physical Review, vol. 99, p. 1274 (1955); by M. N. Hack in Physical Review, vol. 104, p. 84 (1956); by A. Javan in Physical Review, vol. 107, p. 1579 (1957); and many others in later articles in the Physical Review publication.

The observation of double-quantum transitions in the optical region of the spectrum has been made possible by the development of lasers. This observation was made in an experiment on cesium vapor by I. D. Abella as reported in Physical Review Letters, vol. 9, p. 453 (1962), which followed the first observation of double-quantum absorption into a broad band in an inorganic crystal by W. Kaiser and C. G. B. Garrett described in Physical Review Letters, vol. 7, p. 229 (1961). Subsequently, such observations have been focused in a wide variety of materials, such as in other doped inorganic crystals as noted by R. Brannstein and N. Ockman in Physical Review, vol. 134, p. A499 (1964); in organic crystals as reported by W. L. Peticcolas, J. P. Goldsborough and K. E. Rieckhuff in Physical Review Letters, vol. 10, p. 43 (1963); and in organic liquids as described by J. A. Giordmaine and J. H. Howe in Physical Review Letters, vol. 11, p. 207 (1963).

Saturation of the absorption transition, however, has not heretofore been accomplished. Only in part is the absence of saturation a consequence of the breadth of the upper levels. Another crucial factor in determining the saturation is the position of the intermediate state with respect to the quantum energies in the radiation fields. It was suggested first by S. Yatsiv in Physical Review, vol. 113, p. 1538 (1959) that enhancement of multiple quantum transitions could be accomplished by intermediate state resonances. This was demonstrated by A. D. Cohen and D. H. Whiffen in Molecular Physics, vol. 7, p. 449 (1964), and A. Javan and A. Szöke in Physical Review, vol. 137, p. A536 (1965) have discussed the enhancement of optical frequency mixing using resonant phenomena.

The teachings of the prior art are extended according to the present invention in the saturation of a double-quantum absorption transition by utilizing both a laser radiation and stimulated Raman scattering to provide a double-quantum pumped laser.

Accordingly, one object of the present invention is to provide a double-quantum pumped laser.

It is another object of the invention to provide a means for obtaining high power stimulated emission in the infrared region.

It is still another object of the invention to provide a laser having a high power output in what is called the atmospheric "window" for laser communications and radar applications.

These and other objectives are achieved in a laser according to one embodiment of the present invention comprising a laser generating stimulated radiation incident on Raman active material to provide the laser radiation and a Raman radiation, both of which are incident in a material capable of double quantum absorption of these two radiations to produce a stimulated output radiation.

Simply stated, the invention may be comprised of a giant pulse ruby laser, the output of which is used to generate another pulse of light in the near infrared, and the two simultaneous pulses are employed then to excite potassium vapor atoms in the ground state ($4s_{1/2}$) to an excited state ($6s_{1/2}$). The excited atoms then cascade down from this state as stimulated emissions that take place in a number of infrared and visible transitions.

The invention and specific embodiments thereof will be described hereinafter by way of example and with reference to the accompanying drawing, in which:

FIG. 1 is a block diagram of a double-quantum pumped laser according to the invention;

FIG. 2 is a block diagram of a preferred embodiment of the invention; and

FIG. 3 is an energy level diagram of potassium.

With reference to the drawing and more particularly to FIG. 1, there is shown a laser 11 generating a laser radiation 13 interacting with a Raman active material 15 disposed in a container 17 to provide a stimulated Raman emission 19 along with the laser radiation 13 incident on a material 21 in a container 23, which material is capable of double-quantum absorption of these radiations and which material 21 so pumped produces a stimulated output radiation 25. The laser 11 may be a solid-state ruby or neodymium laser, for example. The Raman active material 15 may be nitrobenzene, for example, or others including those described by G. Eckhardt, R. W. Hellwarth, F. J. McClung, S. E. Schwarz, D. Weiner and E. J. Woodbury in Physical Review Letters, vol, 9, p. 455 (1962). And the double-quantum pumped material 21 may be such alkali vapors as potassium, cesium or rubidium. The relationship necessary between the various radiations and the pumped material will be described in detail later in connection with the embodiment of FIG. 2.

According to a preferred embodiment of the invention as shown in block diagram form in FIG. 2, a tunable giant pulse ruby laser 31 creates a pulse of energy 33 having a frequency $\omega_L$. Such a tunable ruby laser is described by I. D. Abella and H. Z. Cummins in the Journal of Applied Physics, vol. 32, p. 1177 (1961). The tuned ruby giant pulse radiation 33 is made incident on a Raman material 35 contained in this example in a cell 37. In this case the Raman material may be 1-bromonaphthalene which upon being excited by the ruby radiation 33 produces a stimulated Stokes radiation 39 at a frequency $\omega_s$, while also propagating therethrough the ruby radiation 33. These two radiations 33 and 39 are then made incident on an alkali vapor 41, such as potassium, cesium or rubidium contained in a vapor container 43.

For double-quantum absorption to provide stimulated emission 45 according to the invention, the ruby laser 31 is thermally tuned so that its radiation 33 has a frequency $\omega_L$ combined with the Raman Stokes radiation 39 at a frequency $\omega_s$ satisfies the relation $$\hbar\omega_L + \hbar\omega_s = \Delta E \qquad (1)$$

where $\Delta E$ is the separation between the ground $s$ state and an excited $s$ or $d$ state in the atoms of the alkali vapor 41. As will be discussed later, in the case of potassium, the most appropriate transition is the $4s$–$6s$ transition. With a power of 1 mw./cm.$^2$ at $\omega_L$ and 1 kw./cm.$^2$ at the Stokes frequency $\omega_s$, the combined collinear radiations 33 and 39 saturate this $4s$–$6s$ transition in the potassium vapor 41 located in the container 43. It should be noted that several materials are suitable as Raman scatterers for this case; bromonaphthalene, chloronaphthalene and nitrobenzene are good choices. Saturation in the vapor cell 43 is achieved with a pressure, for example, of less than 100 torr. This pressure is not critical and can be conveniently optimized.

Because of the high gain of the double-quantum system as proposed, the length of the cell 37 and that of the container 43 is also not critical. A length of 10 cm. for both cells has functioned satisfactorily, for example. Optimum lengths for highest efficiency in the power output is easily obtainable for each particular arrangement and combination of materials. In an arrangement as shown in FIG. 2, and at a vapor pressure of 0.1 torr, a gain over 1,000 cm.$^{-1}$ is established in the $6s$–$5p$, 2,730 and 2,750 cm.$^{-1}$ transitions (see FIG. 3). Subsequently, the cascade decay establishes high gain conditions in all of the downward intervals terminating in the $4p$ states as marked by the heavy lines in FIG. 3. A small feedback provided by the reflectivity of transmission windows is sufficient for maintaining coherent oscillations in any of these transitions.

The simplicity of the structure of potassium permits reliable theoretical calculations with reference to the block diagram of FIG. 1 and the energy level diagram of FIG. 3, as follows:

The giant pulse ruby laser 31 creates the pulse 33 of the order of 1 mw./cm.$^2$ peak power lasting roughly 20 nsec., at a frequency that can be varied by thermal tuning of the ruby crystal (not shown). The wavenumber of the beam is 14401.6 cm.$^{-1}$ at 0° C., and has a variation with temperature of $-0.135$ cm.$^{-1}$/° C. The low-lying energy levels as shown in the National Bureau of Standards (N.B.S.) Circular 467 entitled "Atomic Energy Levels" by C. E. Moore (1949) for potassium is illustrated in FIG. 3. It should be noted that the separation of the $6s_{1/2}$ and $4p_{3/2}$ levels is 14407.76 cm.$^{-1}$, and that the separation of the $4p_{3/2}$ and $4s_{1/2}$ levels is 13042.89 cm.$^{-1}$. Radiation at the former frequency, $\omega_L$, can be obtained by cooling the ruby to around $-40°$ C., and at the latter frequency, $\omega_s$, by stimulated Raman scattering in an appropriate material. Stokes emission from 1-bromonaphthalene, as shown by the referenced Eckhardt article, is downshifted by 1,363 cm.$^{-1}$, so that a beam of Stokes light at 13,044 cm.$^{-1}$ is readily obtainable.

The matrix element for the excitation of the $6s_{1/2}$ state under the application of the ruby and Stokes fields is $$R_{21} = \frac{\langle 6S_{1/2}|\mu_z|4P_{3/2,\ 1/2}\rangle\langle 4P_{3/2,\ 1/2}|\mu_s|4S_{1/2}\rangle \epsilon_0 \epsilon_{-1}}{\omega_{-1} - (\omega 4P_{3/2} - \omega 4S_{1/2}) + i/T_2} \qquad (2)$$

where the power flux in the two beams 33 and 39 is given by $$2cE_0^2 \text{ and } 2cE_{-1}^2 \qquad (3)$$

$T_2$ is the coherence time of the excitation, and is dominated by the coherence time of the Stokes pulse. The Stokes power spectrum has a half-intensity width of 2 cm.$^{-1}$, corresponding to a coherence time of 5.3 psec. The coherence time for Doppler broadening at 300° C. in potassium is 200 psec. At a vapor pressure of 0.1 torr the expected collision broadening for the resonance lines, ($4p$–$4s$), based on measurements on cesium in an article by C. Gregory, Physical Review, vol. 61, p. 465 (1942), yields a coherence time of 500 psec. Actually the collisional broadening should be even less important in the $6s$ state since there are fewer atoms with which resonant exchange is possible. Therefore, the coherence time for the excitation is $T_2 = 5.2$ psec. The matrix elements of the dipole moment can be obtained from known values of the oscillator strengths. Those needed in Equation 2 have been measured by H. Corliss and William R. Bozman in the N.B.S. Monograph 53, Washington (1962), and the measurements have been combined with the calculations of E. M. Anderson and V. A. Zilitis in Optika i Spektroskopiya, vol. 16, p. 177 (1964) which is translated in Opt. Spectry (USSR), vol. 16, p. 99 (1964), to obtain the oscillator strengths shown in FIG. 3. The resulting value for the matrix element is such that $$d = 2R_{21}/\hbar^2 = 0.00985/(\delta+1) \text{ psec.}^{-1} \qquad (4)$$

where the departure from the resonance with the $4p_{3/2}$ state is given by $$\delta = (\omega_{-1} - \omega_{31})T_2 \qquad (5)$$

For convenience, the $4p_{3/2}$ level has been labeled as level 3, the $6s_{1/2}$ as level 2, and the ground level as level 1. In obtaining the matrix element, a ruby laser field of $1.37 \times 10^4$ v./cm. has been chosen for illustration corresponding to a flux of 1 mw./cm.$^2$, and $E_{-1} = 432$ v./cm. corresponding to a Stokes power flux of 1 kw./cm.$^2$.

If a steady state can be obtained, the probability of occupying the second level is given by $$P_{22} = \tfrac{1}{2}S/(1+\Delta^2+S) \qquad (6)$$

where $S$ is the saturation parameter, and $\Delta$ measures the departure from the double-quantum resonance, $$\Delta = (\omega_1 + \omega_{02} - \omega_{21})T_2 \qquad (7)$$

The saturation parameter is $$S = (dT_2)^2 n \qquad (8)$$

where $n$ is the number of random Stokes pulses during the lifetime, $T_1$, of the upper state:

$$n = T_1/T_2 \qquad (9)$$

The natural lifetime of the $6s_{1/2}$ level is 70 nsec., which is longer than the duration of the Stokes pulse, so that a steady state will not be obtained in the absence of more rapid damping of the excitation. In that case, the rate equations should be solved for the transient populations. The solution appears to be obvious; the only change will be to use for $T_1$ the duration of the pump process, which is about 20 nsec. In that case, $n = 3850$, and $$S = 10.1/(1+\delta^2) \qquad (10)$$

Note that in the estimate of the saturation parameter, conservative values were employed for the fluxes at the ruby and Stokes frequencies, and a very short time for coherence time of the double-quantum absorption was used. Nevertheless, $S$ is so large that saturation is obtained even with frequency mismatches of the order of 1–2 wave numbers.

It may be noticed from FIG. 3 that the separation of the $4d_{3/2}$ and $4p_{1/2}$ levels is 14412.94 cm.$^{-1}$. The ruby crystal will produce a laser beam 33 at this wave number if cooled to $-100°$ C., and a material could possibly be found with a Stokes shift of 1,428 cm.$^{-1}$ in order to excite the $4d_{3/2}$ state by resonant double-quantum pumping. However, the dipole matrix element between the $4p_{1/2}$ and $4d_{3/2}$ states is very much smaller than that between $4p_{3/2}$ and $6s_{1/2}$. For equally advantageous choices of the frequency detuning factors, the saturation factor is only $1.1 \times 10^{-4}$ times the value shown in Equation 10.

The intense laser fields may be expected to ionize the potassium atoms by a multiphoton process. Many calculations of multiphoton ionization rates have now been made since the development of the laser. For example, reference may be made to an article by W. Zernik in Physical Review, vol. 135, p. A51 (1964), and by A. Gold and H. B. Bebb in Physical Review Letters, vol. 14, p. 60 (1965). In the present case, the matrix element will be greatly enhanced by the resonances. An estimate of the rate may be arrived at simply by noting that the $6s_{1/2}$ level will be saturated and calculating the rate of ionization from the $6s_{1/2}$ level. This state in potassium is sufficiently like the corresponding state in hydrogen that the formula for the photoionization cross section described by H. A. Kramers in Phil. Magazine, vol. 46, p. 836 (1923) and by R. W. Ditchburn and U. Öpik, in the book "Atomic and Molecular Process," edited by D. R. Bates (Academic Press, New York, 1962), p. 86, may be used to compute an ionization rate from the $6s_{1/2}$ state; in the presence of a radiation flux of 1 mw./cm.$^2$, this rate is $1.6 \times 10^6$ sec.$^{-1}$. The rate is high enough to be seen, but not high enough to cause an appreciable loss of excited atoms.

Double-quantum saturation and the resulting high gain in the decay cascade can be carried out in a variety of additional source combinations. For example, in the embodiment of FIG. 2, laser 31 may stimulate both Stokes and anti-Stokes emissions which are mixed in the material 41 in the proper relationship as described to produce the desired effect. Of course, the same holds true for mixing predetermined anti-Stokes and laser emissions.

From the foregoing it will be seen that double-quantum pumping is achieved in a device according to the invention to provide, for example, high power stimulated emission in the infrared region. The governing principle involved is that the sum of the frequencies of the two pumping radiations must be equal to the energy separation between the initial and final state of the material pumped. Although each of the two pumping radiations need not be exactly on resonance for an intermediate allowed transition, the proximity to such resonance is important for efficient operation.

For high power output performance of the invention, it should again be noted that the population inversion in any subinterval connecting upper excited state has to be accomplished in a very short time to prevent spontaneous emissions from destroying the high gain of the system.

Although two specific embodiments have been herein illustrated, it will be appreciated that other organizations of the specific arrangements shown may be made within the spirit and scope of the invention. Additionally other equivalent components or elements may be substituted for those which have been particularly named.

Accordingly, it is intended that the foregoing disclosure and the showings made in the drawings shall be considered only as illustrations of the principles of this invention and are not to be construed in a limiting sense.

What is claimed is:

1. A laser having resonant double-quantum pumping, comprising a tuned giant pulse laser generating a first energy radiation having a frequency $\omega_L$, a Raman cell coupled to said tuned laser and excited thereby to generate a second energy radiation having a frequency $\omega_S$, and a material having an energy level separation of $\Delta E$ intercepting said first and second energy radiations wherein said radiations are combined and satisfy the relation $\hbar\omega_L + \hbar\omega_S = \Delta E$.

2. A laser having resonant double-quantum pumping, comprising a tuned giant pulse ruby laser generating a first energy radiation having a frequency $\omega_L$; a Raman cell containing 1-bromonaphthalene coupled to said ruby laser and excited thereby to generate a second energy radiation having a frequency $\omega_S$; and a container wherein there is disposed potassium vapor having an energy level separation of $\Delta E$, said vapor simultaneously intercepting said energy radiations which satisfy the relation $$\hbar\omega_L + \hbar\omega_S = \Delta E.$$

3. A laser having resonant double-quantum pumping, comprising a tuned giant pulse ruby laser, a Raman cell coupled to said ruby laser and excited thereby to generate both a Stokes radiation having a frequency of $\omega_L$ and an anti-Stokes radiation having a frequency of $\omega_S$, and a material having an energy level separation of $\Delta E$ intercepting said Stokes and anti-Stokes radiations and wherein said radiations are combined and satisfy the relation $\hbar\omega_L + \hbar\omega_S = \Delta E$.

4. A laser having resonant double-quantum pumping, comprising a tuned neodymium laser generating a first energy radiation having a frequency $\omega_L$, a Raman cell coupled to said tuned laser and excited thereby to generate a second energy radiation having a frequency $\omega_S$, and a material having an energy level separation of $\Delta E$ intercepting said first and second energy radiations wherein said radiations are combined and satisfy the relation $\hbar\omega_L + \hbar\omega_S = \Delta E$.

5. A laser having resonant double-quantum pumping, comprising a high power tuned gas laser generating a first energy radiation having a frequency $\omega_L$, a Raman cell coupled to said tuned laser and excited thereby to generate a second energy radiation having a frequency $\omega_S$, and a material having an energy level separation of $\Delta E$ intercepting said first and second energy radiations wherein said radiations are combined and satisfy the relation $\hbar\omega_L + \hbar\omega_S = \Delta E$.

6. A laser having resonant double-quantum pumping, comprising a tuned giant pulse ruby laser generating a first energy radiation having a frequency $\omega_L$; a Raman cell containing chloronaphthalene coupled to said ruby laser and excited thereby to generate a second energy radiation having a frequency $\omega_S$; and a container wherein there is disposed potassium vapor having an energy level separation of $\Delta E$, said vapor simultaneously intercepting said energy radiations which satisfy the relation $\hbar\omega_L + \hbar\omega_S = \Delta E$.

7. A laser having resonant double-quantum pumping, comprising a tuned giant pulse ruby laser generating a first energy radiation having a frequency $\omega_L$; a Raman cell containing nitrobenzene coupled to said ruby laser and excited thereby to generate a second energy radiation having a frequency $\omega_S$; and a container wherein there is disposed potassium vapor having an energy level separation of $\Delta E$, said vapor simultaneously intercepting said energy radiations which satisfy the relation $$\hbar\omega_L + \hbar\omega_S = \Delta E$$

8. A laser having resonant double-quantum pumping, comprising a tuned giant pulse ruby laser generating a first energy radiation having a frequency $\omega_L$; a Raman cell containing 1-bromonaphthalene coupled to said ruby laser and excited thereby to generate a second energy radiation having a frequency $\omega_S$; and a container wherein there is disposed cesium vapor having an energy level separation of $\Delta E$, said vapor simultaneously intercepting said energy radiations which satisfy the relation $\hbar\omega_L + \hbar\omega_S = \Delta E$.

9. A laser having resonant double-quantum pumping, comprising a tuned giant pulse ruby laser generating a first energy radiation having a frequency $\omega_L$; a Raman cell containing 1-bromonaphthalene coupled to said ruby laser and excited thereby to generate a second energy radiation having a frequency $\omega_S$; and a container wherein there is disposed rubidium vapor having an energy level separation of $\Delta E$, said vapor simultaneously intercepting said energy radiations which satisfy the relation $\hbar\omega_L + \hbar\omega_S = \Delta E$.

No references cited.

JEWELL H. PEDERSEN, *Primary Examiner.*

B. LACOMIS, *Assistant Examiner.*